Dec. 1, 1953    K. S. SIDEL    2,661,233
VEHICLE DOOR CONSTRUCTION FORMING BED PORTION
Filed April 11, 1952    2 Sheets-Sheet 1
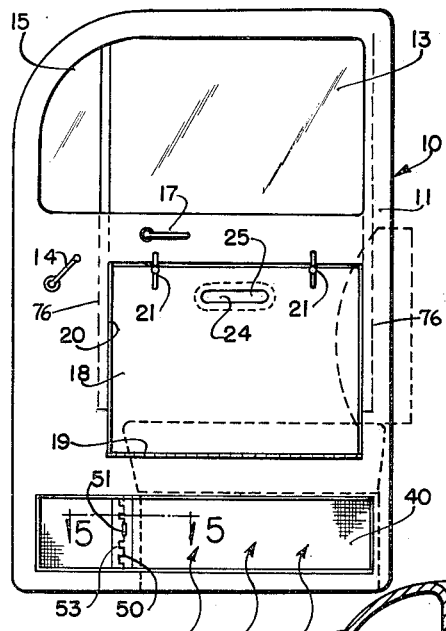
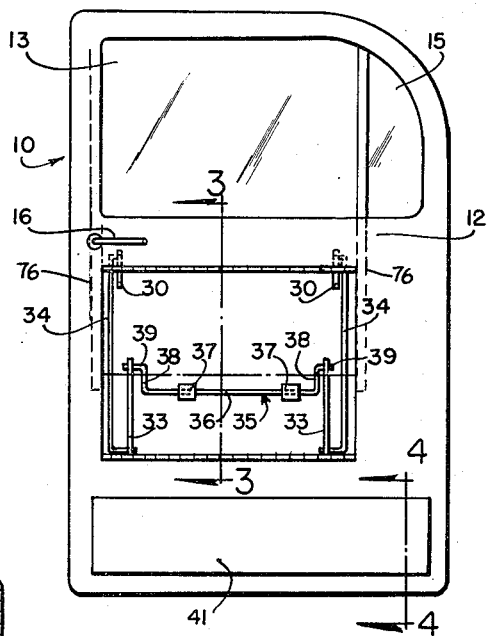
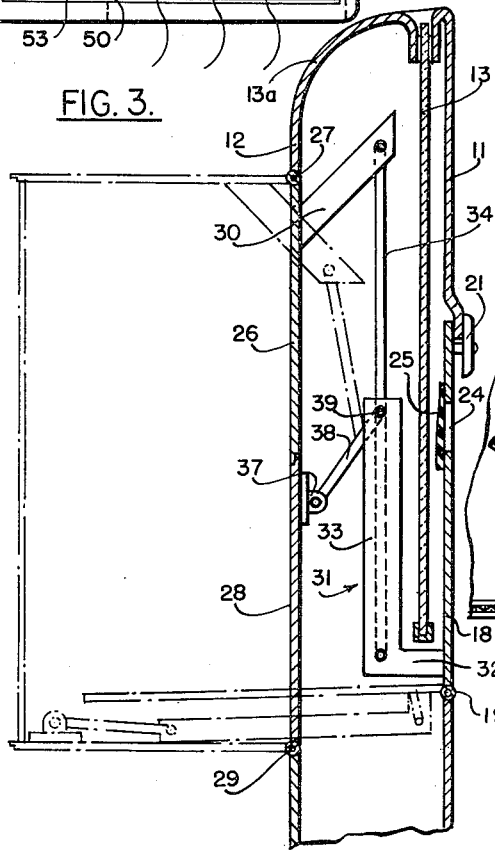
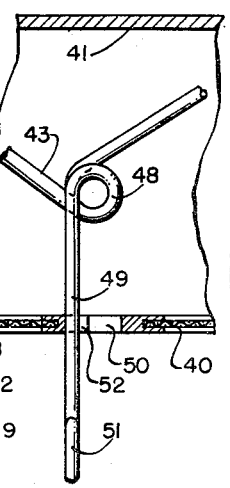
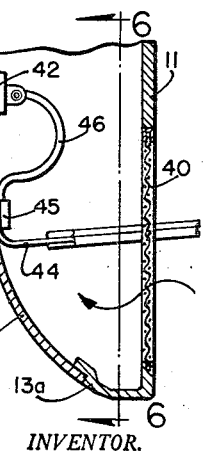
INVENTOR.
Kennith S. Sidel

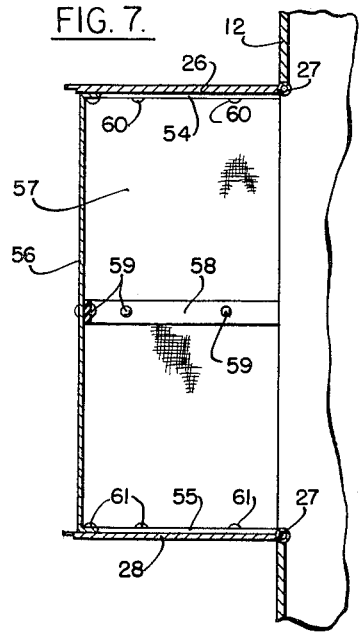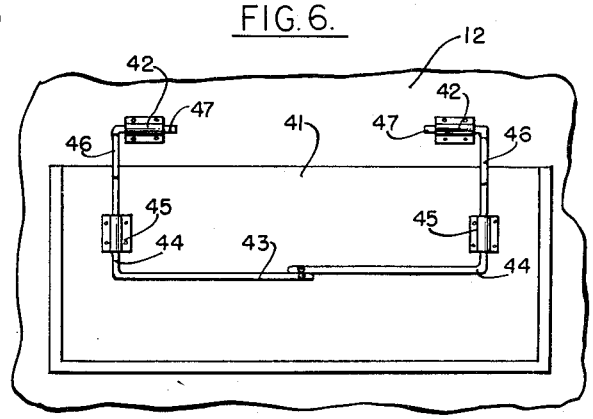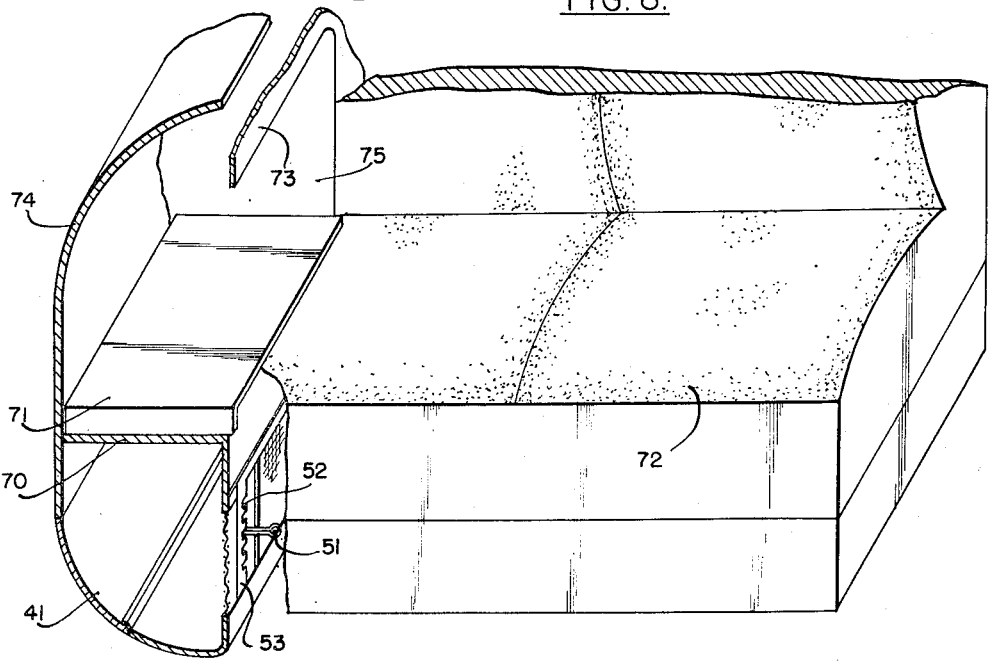

Patented Dec. 1, 1953

2,661,233

UNITED STATES PATENT OFFICE 2,661,233

VEHICLE DOOR CONSTRUCTION FORMING BED PORTION

Kennith S. Sidel, St. Louis, Mo.

Application April 11, 1952, Serial No. 281,705

2 Claims. (Cl. 296—44)

The present invention relates to an improved vehicle door and it consists in the combinations, constructions and arrangements of parts herein described and claimed.

Generally the invention comprises an improved vehicle door having an extension built as a part thereof or attached to such door for the purpose of making use of the conventional seat in the cab of a truck as a bed by adding room for the seat and legs of the person so using the seat. The extension is either rigid or folding depending upon the vehicle design and the width of the cab. A ventilating mechanism is incorporated as a part of the invention. The device is particularly useful for truck cabs wherein a single driver may rest without leaving his cargo and at the time he chooses, thus adding to the safety of travel without adding to the length of the cab for special sleeping accommodations. The ventilating system of the present invention may be utilized to vent the sleeping quarters when the device is used as intended and may also be utilized for ventilating the cab of a truck when the truck is in motion and the remainder of the device folded out of the way.

It is accordingly an object of the invention to provide a novel door having means whereby the same may be utilized as a portion of a bed in connection with the seat of an automobile.

Another object of the invention is to provide, in a device of the character set forth, a novel ventilating mechanism forming a part of the invention.

Another object of the invention is to provide, in a device of the character set forth, a novel handle grip forming a part of the invention.

A further object of the invention is to provide, in a device of the character set forth, a novel combined door mounting and handle forming a part of the invention.

Other and further objects of the invention will become apparent from a reading of the following specification taken in conjunction with the drawing, in which:

Figure 1 is an elevational view of the inner side of a vehicle door embodying the present invention, Figure 2 is a view similar to Figure 1 but partly broken away and taken from the outer side of such door, Figure 3 is an enlarged fragmentary sectional view taken along line 3—3 of Figure 2, Figure 4 is an enlarged fragmentary sectional view taken along line 4—4 of Figure 2, Figure 5 is an enlarged fragmentary sectional view taken along line 5—5 of Figure 1, Figure 6 is a sectional view, partly broken away, taken along line 6—6 of Figure 4, Figure 7 is an enlarged vertical sectional view illustrating the device shown in Figures 1 to 6, inclusive, in opened condition, and Figure 8 is a fragmentary perspective view, partly in section, illustrating a modified form the invention may assume.

Referring more particularly to the drawing, there is shown therein a vehicle door generally designated at 10 and comprising an inner wall 11 and an outer wall 12 which is curved inwardly at its upper and lower ends toward the inner wall 11, as indicated at 13a. The door 10 is provided with the conventional vertically sliding window 13 operable by a handle 14 extending through the inner wall 11 and with a ventilating window 15 also of conventional character. The door 10 is also provided with a latching handle 16 upon the outer side and a coacting latching handle 17 upon the inner side thereof.

An extension door 18 normally forms a part of the inner wall 11 and is hinged at its lower end, as indicated at 19, to the lower edge of an opening 20 provided therefor in the wall 11. A pair of latch members 21 are pivotally mounted to the upper portion of the door 18 and coact to latch the door 18 in vertical position with the wall 11 as clearly shown in Figure 3.

A handle opening 24 is provided in the central upper portion of the door 18 and a flap 25 formed of rubber or other yieldable material is affixed to the rear side of the door 18 immediately behind the opening 24. Mounted in the outer wall 20 is a normally vertically extending upper door 26 which is hinged at its upper end, as indicated at 27, and a normally vertically extending lower door 28 which is hinged at its lower edge, as indicated at 29. Affixed to the inner side of the door 20 adjacent its upper edge is a pair of upwardly extending brackets 30 and affixed to the inner side of the door 18 is a pair of L-shaped brackets 31 each of which is provided with a relatively short leg 32 attached to the door 18 and a relatively long leg 33 which extends upwardly in parallel relation to the door 18.

A pair of relatively long link members 34 each interconnect the outer end of one of the brackets 30 with one of the brackets 31 adjacent the juncture between the legs 32 and 33.

A U-shaped member generally indicated at 35 is provided with a bight portion 36 pivotally mounted in a pair of brackets 37 affixed to the upper inner side of the door 28 and a pair of legs 38 each provided with outturned outer portions 39 which extend through appropriate openings in the outer ends of the legs 33.

The lower end of the inner wall 11 is provided with a screened window 40 and horizontally registering therewith in the outer wall 12 is a door 41. A pair of brackets 42 is affixed to the inner side of the outer wall 12 immediately above the door 41 and a substantially U-shaped combination hinge, door mounting and handle formed of a single piece of wire is provided with a bight portion 43 and a pair of legs 44. Each of the legs 44 is bent upwardly at its outer end to pass through a bracket 45 attached to the inner side of the door 41 and thence continues into an arcuate portion 46 each of which has an inwardly extending portion 47 pivotally engaged in one of the brackets 42. Formed integrally in the center of the bight portion is a loop 48 from which integrally extends a handle 49 which protrudes through a vertical opening 50 in the screened window 40 and terminates in an integrally formed hand grip 51. The handle 49 is selectively engageable in notches 52 formed in a lock plate 53 mounted in the opening 50.

A flexible member of canvas or the like is provided with a top 54, a bottom 55, an outer wall 56 and a pair of side walls 57. A band 58 of elastic material is affixed by rivets 59 or the like to the central portion of the side walls 57 and the outer wall 56 and the top wall 54 is affixed by screws 60 or the like to the inner side of the door 26 while the lower wall 55 of the flexible member is affixed by screws 61 or the like to the inner wall of the door 28.

In operation, it will be apparent that in this form of the invention that the doors 18, 26 and 28 are normally closed when the vehicle is in normal operation but that when the driver thereof desires to utilize the conventional seat of the automobile which is indicated in dotted lines in Figure 1, it is only necessary to raise the window 13, which slides, vertically, in the conventional channels, indicated in dotted lines 76, Figures 1 and 2 and located on each side of door 18 and between inner and outer walls, the door 18 is then unlatched by means of the latch members 21 and pushed inwardly. This action causes the upper door 26 to swing outwardly and upwardly upon its hinge 27 through the medium of the bracket 31, the links 34 and the brackets 30. At the same time the door 28 will swing outwardly and downwardly through the action of the brackets 31 and the links 38. When this occurs the flexible member shown in Figure 7 will be forced to its outward position likewise as shown in Figure 7 and it will be apparent that the door 18 will now form an extension of the conventional vehicle seat so that the person using the conventional seat as a bed may extend his feet and legs onto the door 18. When it is desired to return the just described mechanisms to their normal position, it is only necessary for the operator to extend his fingers through the opening 24 against the action of the covering 25 to thereby grip the door and pull the same to its normal vertical position and thereafter latch the same in such position by the means of members 21. This will reverse the above procedure and cause the closing of the doors 26 and 28.

With regard to the ventilating door 41, it will be apparent that by manipulating the handpiece 51, the handle 49 may be selectively reengaged in any one of the notches 52 to thereby maintain the door 41 either in a closed position or in selected open position so that air may be admitted from without the vehicle through the screen 40 to the interior of the vehicle to thus ventilate the device when used as a bed or, on the other hand, when the device is not being used as a bed extension, the device may be used for additional ventilation to the vehicle, the screen 40 also serves to permit heat from vehicle to heat extension.

Figure 8 shows the rigidly extended outer wall 74 with an inner wall 73 and a door in horizontal position 70 and a mattress 71, of sponge rubber or the like, fastened to the topside of the door, the upper surface of the mattress forms a substantial continuation of the conventional vehicle seat indicated at 72 and below opening 75.

I claim:

1. A device of the character described comprising in combination with a vehicle having a conventional seat and a door adjacent to said seat, the provision of an extension for said vehicle seat mounted in said door, and ventilating means mounted in said door, said door having an outer wall and an inner wall, said extension including a door in said inner wall, a pair of coacting doors in said outer wall, linkage interconnecting said door in the inner wall with the doors in the outer wall whereby movement outwardly of the door in the inner wall causes the doors of the outer wall to move outwardly, said inner door thereby forming an extension of said conventional seat.

2. A device of the character described in claim 1, and said ventilating means including a screened window in the lower portion of the inner wall, a door in said outer wall registering horizontally with said screened window, said screened window having a vertical opening therein, a latch plate having a plurality of vertically-aligned notches and mounted in said vertical opening, a door-mounting hinge interconnecting said door in the outer wall and said outer wall, and a handle connected to said door-mounting hinge extending through said opening and engageable in said notches.

KENNITH S. SIDEL.

References Cited in the file of this patent

UNITED STATES PATENTS

| Number | Name | Date |
|---|---|---|
| 1,780,903 | Berman | Nov. 11, 1930 |
| 2,005,198 | Morrison | June 18, 1935 |